(12) United States Patent
Ishida et al.

(10) Patent No.: US 8,242,196 B2
(45) Date of Patent: Aug. 14, 2012

(54) PUNCTURE SEALANT

(75) Inventors: Takaaki Ishida, Kobe (JP); Hiroyuki Nakagawa, Kobe (JP); Naoya Ichikawa, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 12/826,357

(22) Filed: Jun. 29, 2010

(65) Prior Publication Data
US 2010/0331449 A1    Dec. 30, 2010

(30) Foreign Application Priority Data

Jun. 30, 2009  (JP) ................. 2009-156041
Jul. 1, 2009   (JP) ................. 2009-157088

(51) Int. Cl.
*C08K 5/06* (2006.01)
*B29C 73/00* (2006.01)

(52) U.S. Cl. .................... 524/366; 523/166

(58) Field of Classification Search .......... 524/366
See application file for complete search history.

(56) References Cited

U.S. PATENT DOCUMENTS

| 4,696,822 | A | 9/1987 | Matsummura et al. |
| 6,864,305 | B2 * | 3/2005 | Kishida et al. ............ 524/386 |
| 6,992,119 | B2 * | 1/2006 | Kojima et al. ............ 523/166 |
| 2006/0209626 | A1 * | 9/2006 | Kojima et al. ............ 366/173.2 |

FOREIGN PATENT DOCUMENTS

| JP | 2000-272022 A | 10/2000 |
| JP | 2001-198986 A | 7/2001 |
| JP | 2002-294214 A | 10/2002 |
| JP | 4074073 B | 2/2008 |

* cited by examiner

*Primary Examiner* — Hui Chin
(74) *Attorney, Agent, or Firm* — Birch, Stewart, Kolasch & Birch, LLP

(57) ABSTRACT

The present invention provides a tire puncture sealant which has a reduced viscosity at low temperatures and better injectability at low temperatures while exerting excellent initial sealing performance and storage stability. The present invention also provides a tire puncture sealant which further has better injectability at high temperatures while exerting the seal retention performance. The present invention relates to a tire puncture sealant including: a natural rubber latex; a tackifier; and propylene glycol, wherein the amount of the propylene glycol in 100% by mass of a liquid portion of the puncture sealant is 55% by mass or more, and also relates to a tire puncture sealant including: a natural rubber latex; a tackifier; propylene glycol; and a nonionic surfactant, wherein the nonionic surfactant is a polyoxyalkylene alkyl ether and/or a polyoxyalkylene alkenyl ether.

13 Claims, No Drawings

PUNCTURE SEALANT

TECHNICAL FIELD

The present invention relates to a puncture sealant having an improved viscosity at low temperatures (−30° C. or lower, especially −40° C. or lower) in a puncture repair system in which, when a tire goes flat, the puncture sealant and high-pressure air are sequentially injected into the tire through an air valve on the tire wheel. The present invention also relates to a puncture sealant which further prevents clogging of the air valve upon injection of the puncture sealant at high temperatures.

BACKGROUND ART

As an example of systems for temporarily repairing a flat tire, a system has been known that has a pressure-proof container containing a puncture sealant and a high pressure air source such as a compressor (hereinafter referred also to as the integrated system) (see, FIG. 1 of Patent Document 2). In this system, the puncture sealant is injected through an air valve into a tire, and then high-pressure air is continuously injected until the tire is pumped up to a sufficient pressure for driving.

Puncture sealants of this kind prepared by blending a resin tackifier and ethylene glycol with a natural rubber latex have been proposed as described in Patent Documents 1 to 3. In the case of the puncture sealants including a natural rubber latex as a base and ethylene glycol as an antifreezing agent, creaming tends to occur in a long time storage. Therefore, improvement of the storage stability (long-term storability) of the puncture sealants has been demanded.

In order to solve the problem, Patent Document 4 has proposed a puncture sealant in which propylene glycol is used as an antifreezing agent for improving the stability. The concentration of the propylene glycol in a liquid portion of a conventional puncture sealant is approximately 50%. Use of the conventional puncture sealant at a temperature of −30° C. is guaranteed. However, the viscosity of the puncture sealant drastically increases at a temperature below a certain temperature, and the puncture sealant may be "frozen" at such a temperature. Therefore, in consideration of use in extremely cold regions, puncture sealants which can also be used at a further lower temperature have been demanded. Although the fluidity of puncture sealants can be improved by reducing the amount of the solid components such as rubber particles and a tackifying resin, problematically, puncture sealing performance may be then deteriorated. Further, in the case of use in the integrated system, puncture sealants may be coagulated in the air valve at high temperatures, and thus the pressure of the tire cannot be increased to a predetermined pressure level.

Patent Document 1: JP-A 2002-294214
Patent Document 2: JP-A 2001-198986
Patent Document 3: JP-A 2000-272022
Patent Document 4: JP-B 4074073

SUMMARY OF THE INVENTION

The present invention aims to provide a tire puncture sealant having a reduced viscosity and better injectability at low temperatures while exerting excellent initial sealing performance and excellent storage stability so as to solve the aforementioned problems. The present invention also aims to provide a tire puncture sealant further having better injectability at high temperatures while exerting the seal retention performance.

A first embodiment of the present invention relates to a tire puncture sealant including: a natural rubber latex; a tackifier; and propylene glycol, wherein the amount of the propylene glycol in 100% by mass of a liquid portion of the puncture sealant is 55% by mass or more.

In the first embodiment of the present invention, the solid content in the total mass as 100% by mass of the tire puncture sealant is desirably 20% by mass or more. Moreover, the natural rubber latex is desirably a deproteinized natural rubber latex.

A second embodiment of the present invention relates to a tire puncture sealant including: a natural rubber latex; a tackifier; propylene glycol; and a nonionic surfactant, wherein the nonionic surfactant is a polyoxyalkylene alkyl ether and/or a polyoxyalkylene alkenyl ether.

In the second embodiment of the present invention, the nonionic surfactant desirably has an ethylene oxide structure and/or a propylene oxide structure. Here, the average number of moles of added ethylene oxide and propylene oxide is desirably 10 or more.

In the second embodiment of the present invention, the polyoxyalkylene alkyl ether desirably has an alkyl group having 10 or more carbon atoms, and the polyoxyalkylene alkenyl ether desirably has an alkenyl group having 10 or more carbon atoms.

In the second embodiment of the present invention, the nonionic surfactant is desirably at least one member selected from the group consisting of polyoxyethylene stearyl ether, polyoxyethylene lauryl ether, and polyoxyethylene oleyl ether.

Moreover, the nonionic surfactant desirably has an HLB value of 12 or more.

In the second embodiment of the present invention, the amount of the propylene glycol in 100% by mass of a liquid portion of the puncture sealant is desirably 55% by mass or more.

According to the first embodiment of the present invention, the amount of the propylene glycol in 100% by mass of a liquid portion of the puncture sealant is adjusted to 55% by mass or more in the tire puncture sealant including a natural rubber latex, a tackifier, and propylene glycol. Thus, the tire puncture sealant has a reduced viscosity and better injectability at low temperatures (especially −40° C. or lower) while exerting the initial sealing performance and the storage stability. Therefore, use of the tire puncture sealant makes it possible to perform puncture repairs by the integrated puncture repair system even at low temperatures of −30° C. or lower (especially −40° C. or lower).

According to the second embodiment of the present invention, a polyoxyalkylene alkyl ether and/or a polyoxyalkylene alkenyl ether as a nonionic surfactant is further added in the tire puncture sealant including a natural rubber latex, a tackifier, and propylene glycol. Thus, the puncture sealant can have better injectability at high temperatures while exerting the initial sealing performance, seal retention performance, and long-term storability. Therefore, in the case of injecting the puncture sealant and air through a valve core in the integrated puncture repair system, the puncture sealant can be favorably used even at high temperatures.

MODE FOR CARRYING OUT THE INVENTION

The tire puncture sealant according to the first embodiment of the present invention includes a natural rubber latex, a tackifier, and propylene glycol, and the amount of the propylene glycol in 100% by mass of a liquid portion of the puncture sealant is 55% by mass or more. The tire puncture sealant according to the second embodiment of the present invention includes a natural rubber latex, a tackifier, propylene glycol, and a polyoxyalkylene alkyl ether and/or a polyoxyalkylene alkenyl ether (nonionic surfactant).

Each of the puncture sealants according to the first embodiment and to the second embodiment of the present invention includes a natural rubber latex as a main component in view of the following performances: for example, the puncture sealant can be smoothly injected into a tire; the puncture sealant rapidly fills a puncture hole by running and is solidified by receiving mechanical stimuli from deformation of the tire so that the puncture sealant seals the puncture hole (initial sealing performance); and the sealing performance is maintained to a certain running distance (seal retention performance).

Particularly, a so-called deproteinized natural rubber latex obtained by deproteinizing such a natural rubber latex is more desirably used. This is because the deproteinized natural rubber latex is prevented from decaying with a smaller amount of ammonia, and thereby corrosion damage to steel cords and a pungent odor caused by ammonia are prevented. The deproteinized natural rubber latex can be prepared by, for example, adding a protease to a natural rubber latex in order to degrade the protein, followed by washing, as described in JP-A H10-217344.

In addition to the natural rubber latex, synthetic rubber latexes such as butadiene rubber, styrene-butadiene rubber, acrylonitrile-butadiene rubber, ethylene-vinyl acetate rubber, chloroprene rubber, vinyl pyridine rubber, and butyl rubber may be blended, if necessary.

The rubber latex is an emulsion in which fine particles of the rubber solid are emulsified and dispersed in an aqueous medium containing a small amount of a surfactant as an emulsifier. A rubber latex is normally used that has a rubber solid content of approximately 60% by mass. The amount A of the natural rubber latex (rubber solid) in the total mass (100% by mass) of the puncture sealant is desirably in the range of 15 to 40% by mass in order to achieve good initial sealing performance and seal retention performance. The lower limit of the amount A is more desirably 18% by mass or more, and the upper limit thereof is more desirably 35% by mass or less.

The tackifier is used to improve the adhesion between the natural rubber latex and the tire for achieving better puncture sealing performance. As the tackifier, for example, a tackifying resin emulsion (oil-in-water emulsion) produced by emulsifying and dispersing a tackifying resin in a fine particle state in an aqueous medium containing a small amount of an emulsifier can be used. The tackifying resin to be used as the solid component of the tackifying resin emulsion (tackifier) is desirably a resin that does not coagulate the rubber latex, such as terpene resins, phenol resins, and rosin resins. Other examples of the desirable resin include polyvinyl esters, polyvinyl alcohols, and polyvinyl pyrrolidines.

In the first embodiment and the second embodiment of the present invention, the amount B of the tackifying resin (solid component of the tackifier) in the total mass (100% by mass) of the puncture sealant is desirably 2 to 20% by mass. The lower limit of the amount B is more desirably 3% by mass or more, and the upper limit thereof is more desirably 15% by mass or less.

The amount A of the rubber solid of less than 15% by mass and the amount B of the tackifying resin of less than 2% by mass may lead to insufficient puncture sealing performance and insufficient seal retention performance. On the other hand, the amount A exceeding 40% by mass and the amount B exceeding 20% by mass may lead not only to an impairment of the storability including easy coagulation of the rubber particles during the storage but also to a viscosity increase that may hinder the injection of the puncture sealant through the air valve. Accordingly, the sum of the amount A and the amount B (A+B (solids)) in the total mass (100% by mass) of the puncture sealant is desirably in the range of 20 to 50% by mass. The lower limit of the amount A+B (solids) is more desirably 25% by mass or more, and the upper limit thereof is more desirably 45% by mass or less.

Desirable examples of the emulsifier for the rubber latex and of the emulsifier for the tackifying resin emulsion include surfactants such as anionic surfactants, nonionic surfactants, and cationic surfactants. The total amount of the emulsifiers in the total mass (100% by mass) of the puncture sealant is approximately 0.4 to 2.0% by mass.

According to the first embodiment and the second embodiment of the present invention, propylene glycol is used as an antifreezing agent. Addition of an antifreezing agent in a puncture sealant may in some cases deteriorate the stability of the rubber particles and thus cause coagulation of the particles. However, the puncture sealant including propylene glycol according to the present invention suppresses coagulation of the rubber particles and the tackifier particles on and near the surface of the puncture sealant, thus preventing their change to creamy substances in a long-term storage. Excellent storability (storage stability) can thus be achieved. Moreover, favorable antifreezing effects can be achieved as well.

Use of propylene glycol may increase the viscosity of a puncture sealant at low temperatures, and as a result make it difficult to inject the puncture sealant through an air valve at low temperatures. Thus, considering the use in cold regions, it is preferable to extend the applicable temperature range to lower temperatures. In the first embodiment and the second embodiment of the present invention, increase in the viscosity at a low temperature of $-30°$ C. or lower can be prevented by increasing the amount of propylene glycol, so that the injectability at low temperatures can be improved. Therefore, the puncture sealant according to the first embodiment of the present invention can be favorably used in the integrated puncture repair system even in extremely cold regions (for example, $-40°$ C. or lower). Moreover, as the puncture sealant according to the second embodiment of the present invention has better injectability at high temperatures, the puncture sealant can be favorably used in the integrated puncture repair system at a wide range of temperatures from low to high temperatures.

In the first embodiment of the present invention, the amount C of the propylene glycol in the total mass (100% by mass) of the puncture sealant is desirably 30 to 65% by mass. The amount C of less than 30% by mass may increase the viscosity at low temperatures. On the other hand, the amount C exceeding 65% by mass may reduce the puncture sealing performance due to the reduced solid content in the puncture sealant. The lower limit of the amount C is more desirably 32% by mass or more, and the upper limit thereof is more desirably 60% by mass or less.

In the first embodiment of the present invention, the amount C' of the propylene glycol in 100% by mass of a liquid portion of the puncture sealant is 55% by mass or more, and desirably 60% by mass or more. The amount C' of less than 55% by mass may increase the viscosity at low temperatures, especially at a temperature of $-30°$ C. or lower. The amount C' is desirably 80% by mass or less, and more desirably 70% by mass or less. The amount C' exceeding 80% by mass may increase the viscosity at low temperatures (due to the rise in the freezing point) and as a result the injectability may be deteriorated. The "liquid portion of the puncture sealant"

used herein refers to water and an antifreezing agent such as propylene glycol. Accordingly, the amount C' is a value obtained by the following calculation: (mass of propylene glycol)/(total mass of water and antifreezing agent)×100 (% by weight).

In the second embodiment of the present invention, the amount C of the propylene glycol in the total mass (100% by mass) of the puncture sealant is desirably 20 to 65% by mass. The lower limit of the amount C is more desirably 25% by mass or more, and the upper limit thereof is more desirably 60% by mass or less. The amount C of less than the lower limit or the amount C exceeding the upper limit may cause the similar problems as those mentioned in the first embodiment of the present invention.

In the second embodiment of the present invention, the amount C' of the propylene glycol in 100% by mass of a liquid portion of the puncture sealant is desirably 55% by mass or more, and more desirably 58% by mass or more. The amount C' is desirably 80% by mass or less, and more desirably 70% by mass or less. The amount C' of less than the lower limit or the amount C' exceeding the upper limit may cause the similar problems as those mentioned in the first embodiment of the present invention.

In the second embodiment of the present invention, a polyoxyalkylene alkyl ether and/or a polyoxyalkylene alkenyl ether is used as a nonionic surfactant. These nonionic surfactants may be blended in the first embodiment of the present invention as well. Use of a puncture sealant including propylene glycol in addition to a natural rubber latex and a tackifier at high temperatures may cause clogging. The clogging at high temperatures occurs as follows. After injection of the puncture sealant, a portion of the puncture sealant adhered on the inner wall of a bottle or a hose is dried to be in a rubbery state due to contact with warm air during injection of high-pressure air. The rubbery puncture sealant portions accumulate in narrow spaces (valve core and valve insert) of the flow path and clog the path. In accordance with the present invention, addition of the specific nonionic surfactant improves the injectability at high temperatures, and thus the clogging can be prevented from occurring at high temperatures. This is presumably because as follows: the specific nonionic surfactant is adsorbed on the natural rubber particles which are dispersed by the ionic repulsion of the anionic surfactant; the interparticle potential energy around the particles increases; thus, the thermal stability of the puncture sealant is improved. This effect can be exerted in the case of using the specific nonionic surfactant. Use of a cationic surfactant or an anionic surfactant may cause an increase in the viscosity of the puncture sealant.

Use of the specific nonionic surfactant provides excellent initial sealing performance, seal retention performance and storage stability as well.

The polyoxyalkylene alkyl ether and the polyoxyalkylene alkenyl ether desirably have an ethylene oxide structure and/or a propylene oxide structure. Those which have an ethylene oxide structure and/or a propylene oxide structure as a hydrophilic group can increase the compatibility with the propylene glycol. Particularly desirable are those which have an ethylene oxide structure. In the case that the polyoxyalkylene alkyl ether and/or the polyoxyalkylene alkenyl ether have an ethylene oxide structure and/or a propylene oxide structure, the average number of moles of the added ethylene oxide (EO) and propylene oxide (PO) (sum of the average number of moles of added EO and PO) is one or more, desirably 10 or more, and more desirably 13 or more. The average number of the added moles is desirably 80 or less, more desirably 60 or less, and still more desirably 40 or less. In these cases, the compatibility can be increased and the injectability at high temperatures can be improved.

The number of carbon atoms of the alkyl group in the polyoxyalkylene alkyl ether, and the number of carbon atoms of the alkenyl group in the polyoxyalkylene alkenyl ether each are desirably 4 or more, more desirably 8 or more, still more desirably 10 or more, and particularly desirably 12 or more. The numbers of carbon atoms each are desirably 24 or less, more desirably 22 or less, still more desirably 20 or less, and particularly desirably 18 or less. In these cases, the injectability at high temperatures can be effectively improved.

Examples of the polyoxyalkylene alkyl ether and of the polyoxyalkylene alkenyl ether include a compound represented by the formula (1) below. Use of the compound not only improves the injectability at high temperatures but achieves excellent initial sealing performance, seal retention performance, and storage stability as well.

(In the formula (1), $R^1$ represents a $C_4$-$C_{24}$ alkyl group or a $C_4$-$C_{24}$ alkenyl group. The average number of added moles "n" is 1 to 80. Each AO may be the same as or different from each other and represents a $C_2$-$C_4$ oxyalkylene group.)

The number of carbon atoms of $R^1$ is desirably 8 or more, more desirably 10 or more, and still more desirably 12 or more. The number of carbon atoms of $R^1$ is desirably 22 or less, more desirably 20 or less, and still more desirably 18 or less.

Desirably, n is 10 or more, and more desirably 13 or more. Desirably, n is 60 or less, more desirably 50 or less, and still more desirably 40 or less.

The AO is desirably a $C_2$-$C_3$ oxyalkylene group (oxyethylene group (EO) or oxypropylene group (PO)). In the case that the (AO)$_n$ includes two or more kinds of oxyalkylene groups, the oxyalkylene groups may be arranged in a block form or a random form. In the case that each of $R^1$ and n is in the foregoing range, or that the AO is EO or PO, the injectability at high temperatures can be improved, and excellent initial sealing performance, seal retention performance, and storage stability can be obtained as well.

As the polyoxyalkylene alkyl ether or the polyoxyalkylene alkenyl ether, a compound represented by the following formula (2) is desirably used.

(In the formula (2), $R^2$ represents a $C_8$-$C_{22}$ alkyl group or a $C_8$-$C_{22}$ alkenyl group. EO represents an oxyethylene group, and PO represents an oxypropylene group. The average number of added moles "x" is 1 to 60. The average number of added moles "y" is 0 to 20.)

The number of carbon atoms of $R^2$ is desirably in the same range as that of the $R^1$. $R^2$ may be linear or branched, but is desirably a linear alkyl group or a linear alkenyl group. Desirably, x is 10 or more, and more desirably 13 or more. Also, x is desirably 50 or less, and more desirably 40 or less. Desirably, y is 10 or less, more desirably 4.5 or less, and still more desirably 2.0 or less. Also, y may be 0. In the case that each $R^2$, x, and y is in the foregoing range, the injectability at high temperatures can be improved, and excellent initial sealing performance, seal retention performance, and storage stability can be obtained as well.

The EO and the PO may be arranged in a block form or in a random form. In the case that the EO and the PO are arranged in a block form, the number of the block of EO and the number of the block of PO each may be one or more, as long as each of the average numbers of the added moles is in the foregoing range. In the case that the number of the block of EO is two or more, the number of repetition of the EO in each block may be the same or different. Also, in the case that the number of the block of PO is two or more, the number of repetition of the PO in each block may be the same or different. In the case that the EO and the PO are arranged in a random form, the EO and the PO may be alternately arranged or randomly arranged as long as each of the average numbers of the added moles is in the foregoing range.

In consideration of the injectability at high temperatures, desirable examples of the nonionic surfactant to be used in the present invention include polyoxyethylene alkyl ethers and polyoxyethylene alkenyl ethers (for example, compounds represented by the formula (2), wherein y=0). In these nonionic surfactants, the desirable average number of added moles of EO, the desirable alkyl group, and the desirable alkenyl group are the same as those described above.

Examples of the polyoxyalkylene alkyl ether and of the polyoxyalkylene alkenyl ether include polyoxyethylene stearyl ether, polyoxyethylene oleyl ether, polyoxyethylene cetyl ether, polyoxyethylene myristyl ether, polyoxyethylene lauryl ether, polyoxyethylene polyoxypropylene stearyl ether, polyoxyethylene polyoxypropylene oleyl ether, polyoxyethylene polyoxypropylene cetyl ether, polyoxyethylene polyoxypropylene myristyl ether, and polyoxyethylene polyoxypropylene lauryl ether. In consideration of the injectability at high temperatures, polyoxyethylene stearyl ether, polyoxyethylene oleyl ether, and polyoxyethylene lauryl ether are desirable among the above examples.

The HLB (Hydrophilic-lipophilic balance) value (calculated by Griffin's method) of the polyoxyalkylene alkyl ether and the polyoxyalkylene alkenyl ether is desirably 12 or more, and more desirably 13 or more. The HLB value is desirably 19 or less, and more desirably 17 or less. The desirable HLB values can increase the compatibility and improve the stability at high temperatures, leading to better storability and better injectability at high temperatures. Moreover, it is also possible to achieve excellent puncture sealing performance, seal retention performance and low-temperature properties.

Examples of the commercially available nonionic surfactants include Emulgen 320P (formula (2): $R^2$=stearyl group, x=13, y=0), Emulgen 420 (formula (2): $R^2$=oleyl group, x=20, y=0), Emulgen 430 (formula (2): $R^2$=oleyl group, x=30, y=0), Emulgen 150 (formula (2): $R^2$=lauryl group, x=40, y=0), Emulgen 109P (formula (2): $R^2$=lauryl group, x=9, y=0), Emulgen 120 (formula (2): $R^2$=lauryl group, x=12, y=0), and Emulgen 220 (formula (2): $R^2$=cetyl group, x=12, y=0) (all produced by Kao Corporation).

In the first embodiment and the second embodiment of the present invention, the total amount D of the polyoxyalkylene alkyl ether and the polyoxyalkylene alkenyl ether in the total mass (100% by mass) of the puncture sealant is desirably 1 to 12% by mass. The amount D of less than 1% by mass may not provide sufficient clogging-prevention effects at high temperatures. On the other hand, the amount D exceeding 12% by mass may result in insufficient sealing properties and increase the viscosity at room temperature. The lower limit of the amount D is more desirably 1.5% by mass or more, and the upper limit thereof is more desirably 10% by mass or less. Here, the amount D is a value that does not include the amount of polyoxyalkylene alkyl ether and/or polyoxyalkylene alkenyl ether as emulsifier in the rubber latex and the tackifying resin emulsion.

In the first embodiment and the second embodiment of the present invention, the total amount D' of the polyoxyalkylene alkyl ether and the polyoxyalkylene alkenyl ether in 100% by mass of the surfactants in the puncture sealant is desirably 30% by mass or more, and more desirably 40% by mass or more. The desirable amount D' can effectively improve the injectability at high temperatures.

The sum of the amount C and the amount D (C+D) in the total mass (100% by mass) of the puncture sealant is desirably 34 to 65% by mass in consideration of: achieving a good balance between lowering of the freezing point and prevention of viscosity increase at low temperatures, thereby extending the applicable temperature range to lower temperatures; improving the injectability at high temperatures; and securing the stability of the puncture sealant. The lower limit of the amount C+D is more desirably 36% by mass or more, and the upper limit thereof is more desirably 62% by mass or less.

The puncture sealant of the present invention may further contain other ingredients as long as the effects of the present invention are not inhibited.

The puncture sealant of the present invention is produced by a usual method. That is, the puncture sealant can be produced by, for example, mixing of each of the foregoing ingredients in conventional manners.

EXAMPLES

The present invention will be specifically described based on examples; however, the present invention is not limited thereto.

Production Example 1

A protease from bacteria was added to a field latex (solid content: 30% by mass) and allowed to stand at 40° C. for 24 hours to give a protein-degraded field latex. The resulting field latex was purified with a rotary flat membrane separator according to the method described in JP-B 3350593 and concentrated until the solid content reached 60% by mass, thereby providing a deproteinized natural rubber latex.

Examples 1 to 4, and Comparative Example 1

Puncture sealants were produced using the prepared deproteinized natural rubber latex based on the formulation shown in Table 1.

The tackifier and the nonionic surfactant used are as follows.

Tackifier: Terpene resin emulsion (solid content: about 50% by mass)

Emulgen 420: Polyoxyethylene oleyl ether (formula (2): $R^2$=oleyl group, x=20, y=0; HLB value=13.6; nonionic surfactant produced by Kao Corporation)

Each of the obtained puncture sealants was evaluated for the viscosity at low temperatures (−30° C., −40° C.), puncture sealing performance, and storability (storage stability) according to the methods below. Table 1 shows the results.

(1) Viscosity at Low Temperature (−30° C., −40° C.)

The viscosity of the puncture sealants at −30° C. and −40° C. was measured with a Type B viscometer (Brookfield viscometer).

(2) Puncture Sealing Performance (Initial Sealing Performance)

A puncture hole was made in a tire of size 185/65R15 by a nail 4.0 mm in diameter. After removal of the nail, the puncture sealant in an amount of 500 ml was injected into the tire, and air pressure was applied up to 200 kPa. After the tire was made to rotate at 60 km/h for 10 minutes at a load of 3.5 kN on a drum, whether the puncture hole was sealed or not was evaluated. The results were expressed on a two-point scale of A (sealed) and B (not sealed).

(3) Storability (Storage Stability)

The prepared puncture sealant in an amount of 500 ml was placed in a bottle-shaped container, and allowed to stand still in an oven at 80° C. for two months. After the storage, the amount of a creamy substance generated was measured and expressed in a mass ratio (%) relative to the whole amount of the puncture sealant.

TABLE 1

|  |  | Comparative Example 1 | Example 1 | Example 2 | Example 3 | Example 4 |
|---|---|---|---|---|---|---|
| Deproteinized natural rubber latex | | 55 | 55 | 50 | 30 | 53 |
| (Solid content: 60% by mass) | | (33) | (33) | (30) | (18) | (32) |
| Tackifier (Solid content: 50% by mass) | | 15 | 11 | 13 | 10 | 11 |
| | | (7.5) | (5.5) | (6.5) | (5) | (5.5) |
| Propylene glycol | | 30 | 34 | 37 | 60 | 34 |
| Emulgen 420 | | | | | | 2 |
| Solid content | | 40.5 | 38.5 | 36.5 | 23 | 31.8 |
| Water content | | 29.5 | 27.5 | 26.5 | 17 | 26.7 |
| Amount of antifreezing agent | | 30 | 34 | 37 | 60 | 34 |
| Concentration of propylene glycol aqueous solution (%) | | 50.4 | 55.3 | 58.3 | 77.9 | 56 |
| Results | Viscosity at −30° C. [mPa · s] | 2000 | 2300 | 2100 | 1500 | 2100 |
| | Viscosity at −40° C. [mPa · s] | 40000 | 8000 | 5000 | 4500 | 7500 |
| | Puncture sealing performance | A | A | A | A | A |
| | Storability (%) | 8 | 10 | 10 | 5 | 10 |

As shown in Table 1, the puncture sealants of Examples each including 55% by mass or more of propylene glycol per 100% by mass of a liquid portion of the puncture sealant (i.e. the concentration of the propylene glycol aqueous solution was 55% by mass or more) significantly lowered the viscosity at a low temperature (−40° C.) while ensuring the puncture sealing performance and the storability. On the other hand, the puncture sealant of Comparative Example 1, in which the concentration of the propylene glycol aqueous solution was less than 55% by mass, showed a very large increase in the viscosity at a low temperature (−40° C.).

Examples 5 to 10, and Comparative Examples 2 to 4

Puncture sealants were produced using the prepared deproteinized natural rubber latex based on the formulation shown in Table 2.

The tackifier and the surfactants used are as follows.

Tackifier: Terpene resin emulsion (solid content: about 50% by mass)

Emulgen 320P: Polyoxyethylene stearyl ether (formula (2): $R^2$=stearyl group, x=13, y=0; HLB value=13.9; produced by Kao Corporation)

Emulgen 420: Polyoxyethylene oleyl ether (formula (2): $R^2$=oleyl group, x=20, y=0; HLB value=13.6; produced by Kao Corporation)

Emulgen 430: Polyoxyethylene oleyl ether (formula (2): $R^2$=oleyl group, x=30, y=0; HLB value=16.2; produced by Kao Corporation)

Emulgen 150: Polyoxyethylene lauryl ether (formula (2): $R^2$=lauryl group, x=40, y=0; HLB value=18.4; produced by Kao Corporation)

Emal 270J: Sodium polyoxyethylene lauryl ether sulfate (produced by Kao Corporation)

Emal 2FG: Sodium lauryl sulfate (produced by Kao Corporation)

Each of the obtained puncture sealants was evaluated for the injectability at high temperatures, puncture sealing performance, seal retention performance, storability (storage stability), and the viscosity at low temperatures (−30° C., −40° C.) according to the methods below. Table 2 shows the results.

(1) Injectability at High Temperatures

The puncture sealant was injected into a tire with an integrated puncture repair system at a temperature of 50° C. Whether the tire pressure was increased to a predetermined level or not was evaluated, and the results were expressed on a two-point scale of A (increased) and B (not increased).

(2) Puncture Sealing Performance

The puncture sealing performance was evaluated by the same method as mentioned earlier.

(3) Seal Retention Performance

The tire was also checked for the leakage of air from the puncture hole during 100 km running after the sealing. The results were expressed on a two-point scale of A (no air leakage occurred) and B (air leakage occurred).

(4) Viscosity at Low Temperatures (−30° C., −40° C.)

The viscosity at low temperatures was evaluated by the same method as mentioned earlier.

(5) Storability (Stability with Time)

After each of the prepared puncture sealants was allowed to stand for 10 days at a temperature of 70° C., the change in state of the puncture sealant was visually evaluated. The results were expressed on a four-point scale of S (remained liquid), A (changed to slightly creamy), B (changed to creamy), and C (solidified).

TABLE 2

|  |  | Comparative Example 2 | Comparative Example 3 | Comparative Example 4 | Example 5 | Example 6 | Example 7 | Example 8 | Example 9 | Example 10 |
|---|---|---|---|---|---|---|---|---|---|---|
| Deproteinized natural rubber latex (Solid content: 60% by mass) |  | 55 (33) | 55 (33) | 55 (33) | 55 (33) | 55 (33) | 55 (33) | 55 (33) | 55 (33) | 53 (32) |
| Tackifier (Solid content: 50% by mass) |  | 15 (7.5) | 10 (5.0) | 10 (5.0) | 13 (6.5) | 9 (4.5) | 13 (6.5) | 13 (6.5) | 13 (6.5) | 11 (5.5) |
| Propylene glycol |  | 30 | 30 | 30 | 30 | 30 | 30 | 30 | 30 | 34 |
| Emulgen 320P |  |  |  |  | 2 | 6 |  |  |  |  |
| Emulgen 420 |  |  |  |  |  |  | 2 |  |  | 2 |
| Emulgen 430 |  |  |  |  |  |  |  | 2 |  |  |
| Emulgen 150 |  |  |  |  |  |  |  |  | 2 |  |
| Emal 270J |  |  | 5 |  |  |  |  |  |  |  |
| Emal 2FG |  |  |  | 5 |  |  |  |  |  |  |
| Results | Injectability at high temperatures | B | B | B | A | A | A | A | A | A |
|  | Puncture sealing performance | A | A | A | A | A | A | A | A | A |
|  | Sealing retention performance |  |  |  | A | A | A | A | A | A |
|  | Viscosity at −30° C. [mPa·s] | 2000 | 2400 | 2400 | 2200 | 2500 | 2200 | 2200 | 2200 | 2100 |
|  | Viscosity at −40° C. [mPa·s] | 40000 | 28000 | 28000 | 33000 | 22000 | 33000 | 33000 | 33000 | 7500 |
|  | Storability | A | A | A | A | A | A | A | A | A |

As shown in Table 2, the puncture sealants of Examples each including a specific nonionic surfactant and propylene glycol achieved excellent injectability at high temperatures while ensuring the puncture sealing performance, seal retention performance and storability. Moreover, the viscosity at low temperatures was excellent as well. On the other hand, the puncture sealants of Comparative Examples including an anionic surfactant and propylene glycol or including no surfactant showed poor injectability at high temperatures.

Further, the viscosity at −40° C. of the puncture sealant of Example 10 including a larger amount of propylene glycol was significantly lowered.

The invention claimed is:

1. A tire puncture sealant, comprising:
   a natural rubber latex;
   a tackifier;
   a nonionic surfactant; and
   propylene glycol,
   wherein the amount of the propylene glycol in 100% by mass of a liquid portion of the puncture sealant is 55% by mass or more.

2. The tire puncture sealant according to claim 1, wherein the solid content in the total mass as 100% by mass of the puncture sealant is 20% by mass or more.

3. The tire puncture sealant according to claim 1, wherein the natural rubber latex is a deproteinized natural rubber latex.

4. The tire puncture sealant according to claim 1, wherein the nonionic surfactant is a polyoxyalkylene alkyl ether and/or a polyoxyalkylene alkenyl ether.

5. The tire puncture sealant according to claim 1, wherein the nonionic surfactant has an ethylene oxide structure and/or a propylene oxide structure.

6. The tire puncture sealant according to claim 5, wherein the average number of moles of added ethylene oxide and propylene oxide is 10 or more.

7. The tire puncture sealant according to claim 4, wherein the polyoxyalkylene alkyl ether has an alkyl group having 10 or more carbon atoms.

8. The tire puncture sealant according to claim 4, wherein the polyoxyalkylene alkenyl ether has an alkenyl group having 10 or more carbon atoms.

9. The tire puncture sealant according to claim 1, wherein the nonionic surfactant is at least one member selected from the group consisting of polyoxyethylene stearyl ether, polyoxyethylene lauryl ether, and polyoxyethylene oleyl ether.

10. The tire puncture sealant according to claim 1, wherein the nonionic surfactant has an HLB value of 12 or more.

11. The tire puncture sealant according to claim 1, wherein the amount of the solid component of the tackifier in the total mass of the puncture sealant is 2 to 6.5% by mass.

12. The tire puncture sealant according to claim 1, wherein the tackifier is a tackifier resin emulsion.

13. The tire puncture sealant according to claim 4, wherein the total amount of the polyoxyalkylene alkyl ether and the polyoxyalkylene alkenyl ether in the total mass of the puncture sealant is 1 to 12% by mass.

* * * * *